United States Patent [19]
McCarthy

[11] Patent Number: 5,428,669
[45] Date of Patent: Jun. 27, 1995

[54] AUTOMATIC CHANNEL SELECTION SYSTEM FOR A CORDLESS TELEPHONE

[75] Inventor: Dennis R. McCarthy, Syracuse, N.Y.

[73] Assignee: Thomson Consumer Electronics, Inc., Indianapolis, Ind.

[21] Appl. No.: 74,687

[22] Filed: Jun. 10, 1993

Related U.S. Application Data

[63] Continuation of Ser. No. 638,503, Jan. 8, 1991, abandoned.

[51] Int. Cl.⁶ ............................................. H04M 11/00
[52] U.S. Cl. ........................................ 379/61; 379/62; 455/33.2
[58] Field of Search ...................... 379/52, 56, 58, 61, 379/62, 63, 67, 87, 88; 455/31.1, 34.1, 39.1, 67, 33.2

[56] References Cited

U.S. PATENT DOCUMENTS

| | | | |
|---|---|---|---|
| 4,694,485 | 9/1987 | Iwase | 379/62 |
| 4,706,274 | 11/1987 | Baker et al. | 379/61 |
| 4,768,219 | 8/1988 | Yamagata et al. | 379/61 |
| 4,783,780 | 9/1988 | Alexis | 370/95.1 |
| 4,894,856 | 1/1990 | Nakanishi et al. | 379/61 |
| 4,926,421 | 5/1990 | Kawano et al. | 370/95.1 |
| 4,979,205 | 12/1990 | Haraguchi et al. | 379/61 |
| 5,140,628 | 8/1992 | Murata et al. | 379/61 |
| 5,237,603 | 8/1993 | Yamagata et al. | 379/61 |
| 5,239,676 | 8/1993 | Strawczynski et al. | 455/33.2 |

FOREIGN PATENT DOCUMENTS 0189827  4/1989  Japan ...................... 379/61

OTHER PUBLICATIONS

Southwestern Bell, "Freedom Phone", The Sharper Image, Oct. 1986.
Panasonic, "Operating Instructions", Cordless phone KX-T3000, Sep. 23, 1988.
Sony, "Cordless Telephone Operating Instructions SPP-75".

Primary Examiner—Curtis Kuntz
Assistant Examiner—William Cumming
Attorney, Agent, or Firm—Joseph S. Tripoli; Peter M. Emanuel; Thomas F. Lenihan

[57] ABSTRACT

In a cordless telephone set, a single RF communications channel selection switch, which may be mounted on either of the base unit and handset unit, selects the frequency for the unit to which it is mounted. The other unit of the base unit and handset unit selects alternate frequencies in response to a series of unacknowledged communications, until it receives an acknowledgement on a particular channel. After receiving an acknowledgement, an indication of the current RF communications channel is stored in memory. If no acknowledgement is received after trying all channels, then the original RF communications channel is selected.

2 Claims, 5 Drawing Sheets

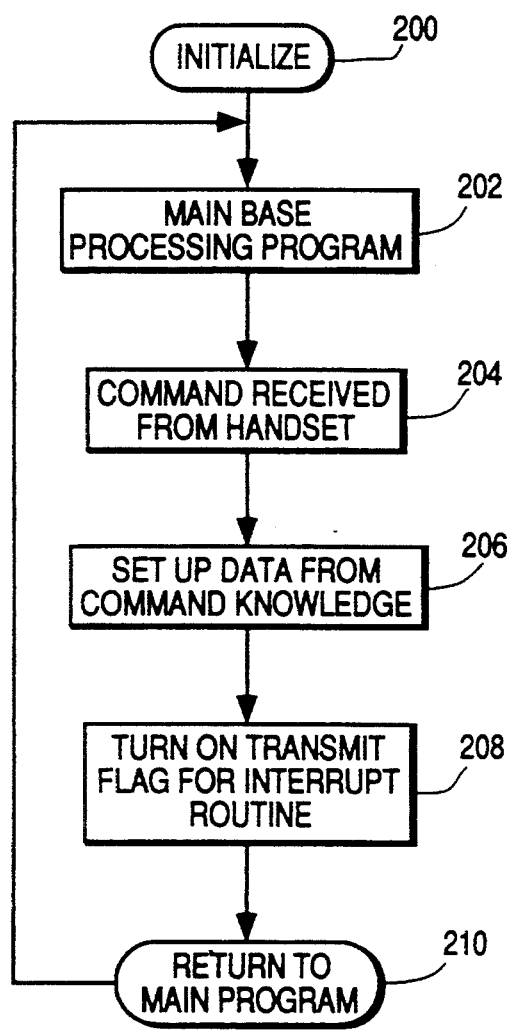
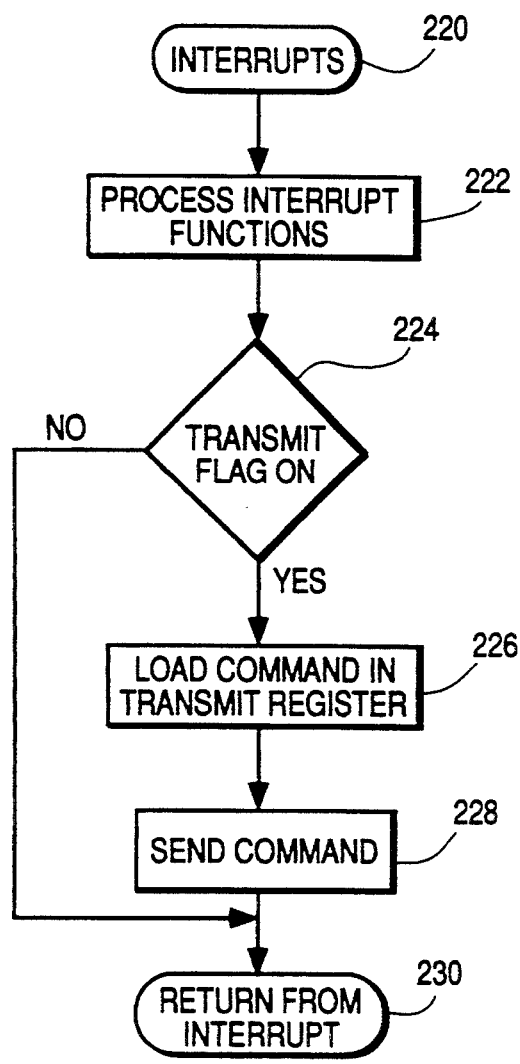
FIG. 2a  FIG. 2b

AUTOMATIC CHANNEL SELECTION SYSTEM FOR A CORDLESS TELEPHONE

This is now abandoned a continuation of application Ser. No. 07/638,503, filed Jan. 8, 1991.

FIELD OF THE INVENTION

The subject application generally concerns the field of cordless telephones, and specifically concerns cordless telephones having the capability of selecting one of at least two communication channels.

BACKGROUND OF THE INVENTION

Cordless telephone sets comprise a base unit and a remote handunit which communicate with each other over via radio frequency (RF) transmissions. Although these transmissions are of relatively low power, and consequently of limited range, it is nevertheless possible for close neighbors to own cordless telephones which operate on the same frequency, and thus interfere with each other. To alleviate this problem, many cordless telephones include the capability of selecting one of two or more RF channels for communication between the base unit and the remote handunit. Such a cordless telephone set is known from GE cordless telephone model number 2-9675 manufactured by Thomson Consumer Electronics, Inc. Indianapolis, Ind.

In such cordless telephone sets, a channel selection switch on the base unit and a channel selection switch on the remote handunit, select one of two or more crystal oscillator circuits, or program respective digital frequency synthesizers. Clearly, these channel selection switches must be set to select the same channel in order for the unit to operate. The channel selection switches must be user-accessible so that they may be switched when desired, but on the other hand, are usually placed behind covers and hidden from view because these switches are not frequently operated. The inclusion of a channel selection switch on both the base unit and the handunit is a source of problems in setting up the communications channel of the cordless telephone set, because each of the switches must be located by the user, and set to the same channel selection setting.

SUMMARY OF THE INVENTION

In a cordless telephone set, a single RF communications channel selection switch, which may be mounted on either of the base unit and handset unit, selects the frequency for the unit to which it is mounted. The other unit of the base unit and handset unit selects alternate frequencies in response to a series of unacknowledged communications, until it receives an acknowledgement on a particular channel. After receiving an acknowledgement, an indication of the current RF communications channel is stored in memory. If no acknowledgement is received after trying all channels, then the original RF communications channel is selected.

BRIEF DESCRIPTION OF THE DRAWING

FIGS. 2a and 2b are illustrations of flowcharts of the control program for the base unit controller of FIG. 1, and are helpful for understanding the invention.

DETAILED DESCRIPTION OF THE EMBODIMENT

Figure 1:
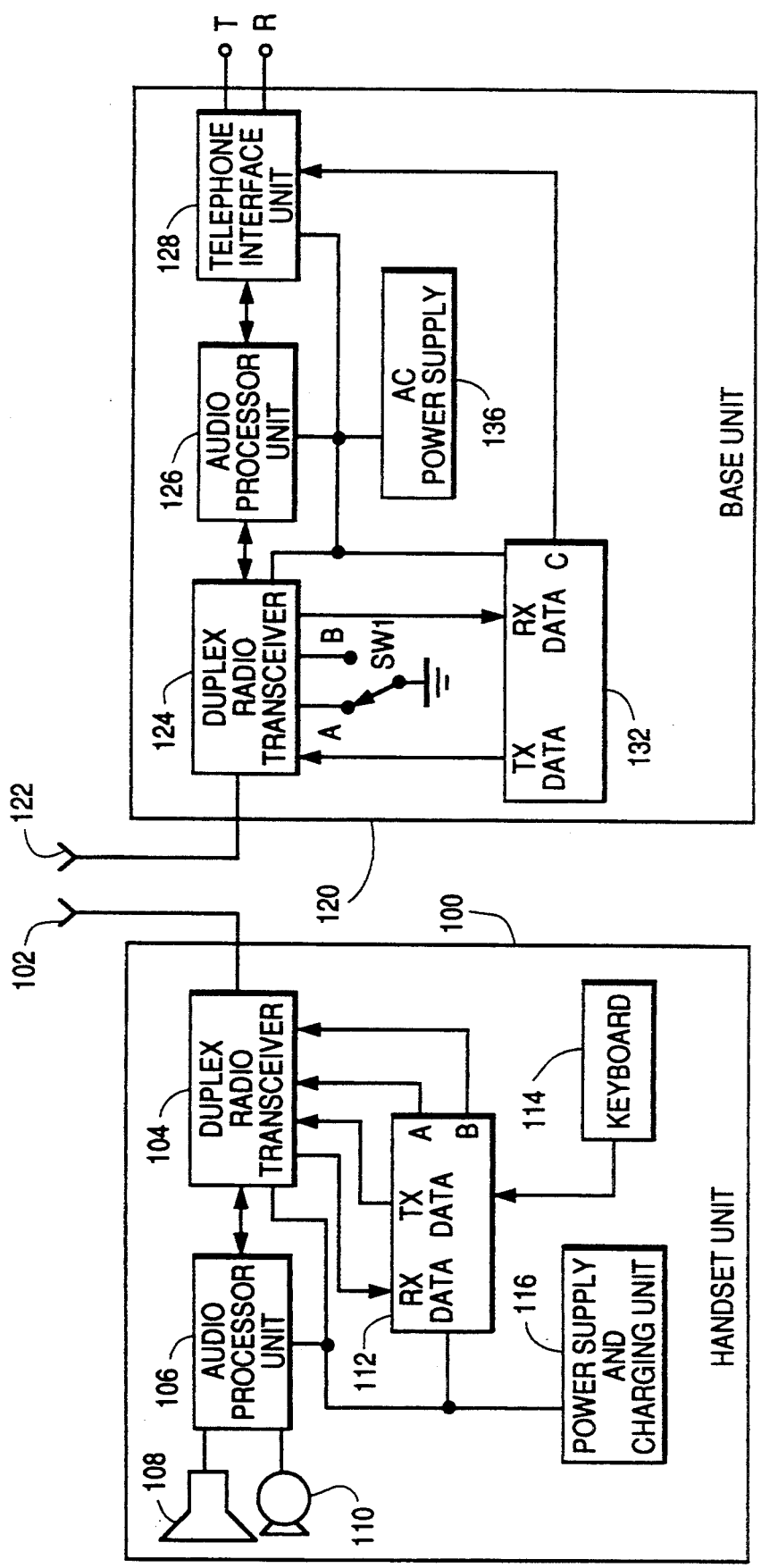
FIG. 1 shows, in schematic form, a cordless telephone set in accordance with the subject invention.

FIG. 1 is a simplified illustration of a cordless telephone set comprising a handset unit 100 and a base unit 120. Handset unit 100 receives and transmits RF signals via an antenna 102. Antenna 102 is coupled to a duplex radio transceiver unit 104 which is capable of operation in a receiver mode and in a transmitter mode. In the receiver mode, transceiver unit 104 applies received and demodulated audio signals to an audio processor unit 106 for amplification and ultimate reproduction in speaker 108. Also in the receiver mode, transceiver 104 also provides digital data to the "receive data" (i.e., Rxdata) terminal of controller 112 In the transmitter mode, transceiver 104 receives audio signals, picked-up (i.e., detected) by microphone 110 and amplified by audio processor unit 106, for transmission to base unit 120. Also in transmitter mode, transceiver 104 receives "transmit data" (i.e., Txdata) from controller 112, for transmission to base unit 120. Controller 112 is coupled to a keyboard 114 for receiving keystroke commands from a user. Controller 112 also has two output lines A and B for controlling transceiver 104 to operate on RF communications channel A or on RF communications channel B. Handunit 100 also includes a power supply and charging unit 116 for supplying operating power to the circuitry of the handunit.

Base unit 120 receives and transmits RF signals via an antenna 122. Antenna 122 is coupled to a duplex radio transceiver unit 124 which is capable of operation in a receiver mode and in a transmitter mode. In the receiver mode, transceiver unit 124 applies received and demodulated audio signals to an audio processor unit 126 for amplification and coupling to the telephone system via a telephone interface unit 128. Telephone interface unit 128 is connected to the telephone system via two terminals traditionally known as tip (T) and ring (R). Also in the receiver mode, transceiver 124 also provides digital data to the "receive data" (i.e., Rxdata) terminal of controller 132. Controller 132 has a control terminal C by which telephone interface unit 128 can be controlled to establish communication over the telephone system. In the transmitter mode, transceiver 124 receives audio signals, conveyed by the telephone system via telephone interface unit 128 and amplified by audio processor unit 126, for transmission to handunit 100. Also in transmitter mode, transceiver 124 receives "transmit data" (i.e., Txdata) from controller 132, for transmission to handunit 100. Transceiver 124 is coupled to a switch SW1 via two input lines A and B, which control transceiver 124 to operate on RF communications channel A or on RF communications channel B. Base unit 120 also includes an AC power supply unit 136 for supplying operating power to the circuitry of the base unit.

Note that handunit 100 does not include a selection switch for selecting RF communication channels. The mounting of selection switch SW1 on base unit 120 only, eliminates the problem of having to locate a possibly-hidden selection switch on the handunit, and having to match the switch settings in order to set up communications between the base unit and handunit. The present invention ensures that the base unit and handunit still operate on the same channel in the following manner.

Handunit controller 112, which may be a microcomputer, microprocessor, or a custom integrated circuit, is programmed to receive an acknowledgement from base unit 120 for any "on-hook" or "off-hook" command sent by handunit 100. If no acknowledgement is received, handunit controller 112 will resend the command a predetermined number of times, each time looking for the acknowledgement from the base unit. After the expiration of the predetermined number of transmissions, handunit controller 112 will then cause transceiver 104 to select its next RF communications channel, and repeat its transmission and wait for acknowledgement sequence. Although only two RF communications channels are set forth in the present embodiment, transceiver 104 may have as many as 10 channels in other embodiments. If an acknowledgement is received, handunit controller 112 stores information regarding; its currently selected RF communications channel in its memory. If no acknowledgement is received, handunit controller 112 causes transceiver 104 to attempt communication on all channels in turn, and then return to the original channel.

FIGS. 2a and 2b are flowcharts of portions of the control program for base unit controller 132, which may be a microcomputer, microprocessor, or a custom integrated circuit. Initialization of registers for execution of the main program is begun at step 200. The main program is entered at step 202. In step 204 a command is received from handunit 100. Steps 206 and 208 prepare for transmission of an acknowledgement to handunit 100 via an interrupt routine shown in FIG. 2b. Initialization for the interrupt routine is begun at step 220. At step 222, the interrupt routine is entered. A determination is made at step 224 as to whether or not the transmit flag is on. If so, the command to be sent is loaded (step 226) and sent (step 228). If not the routine is exited at step 230, and returns to step 210 of the main program.

Figure 3A:
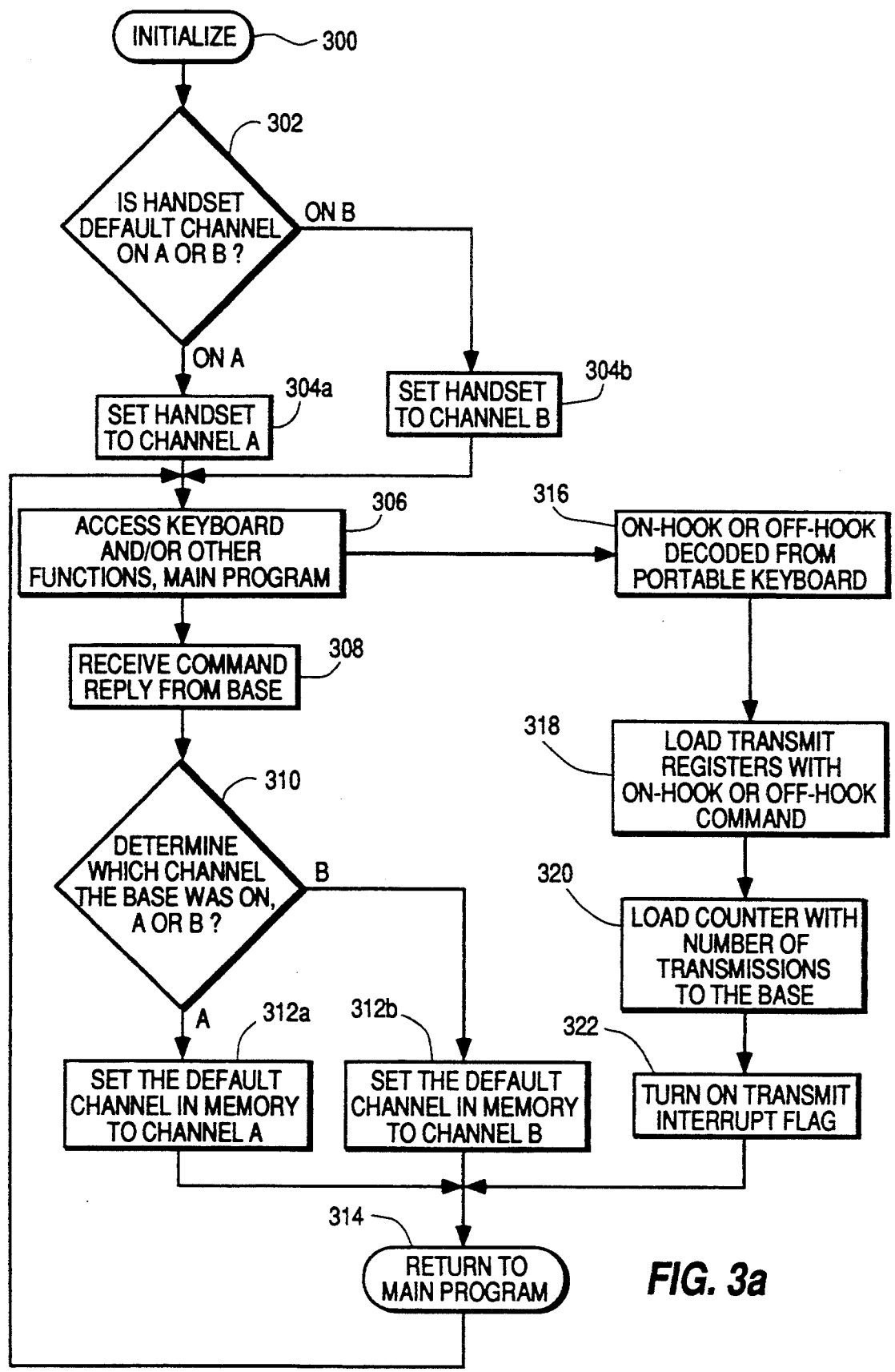
FIGS. 3a and 3b are illustrations of flowcharts of the control program for the handunit controller of FIG. 1, and are helpful for understanding the invention.

The main program for handunit controller 112 is shown in FIG. 3a. Initialization of registers for execution of the main program is begun at step 300. The main program is entered at step 302 wherein a determination is made as to which RF communications channel is the default channel. If channel A is the default channel, the program advances to step 304a, if not then it advances to step 304b. Keyboard 114 is checked at step 306, a key is pressed, the program advances to step 316 for the decoding of an on-hook or of-hook command. The transmit registers are then loaded with the appropriate command (step 318), the counter is loaded with the above-mentioned predetermined number of counts (320), and the transmit interrupt flag is turned on (step 322).

Figure 3B:
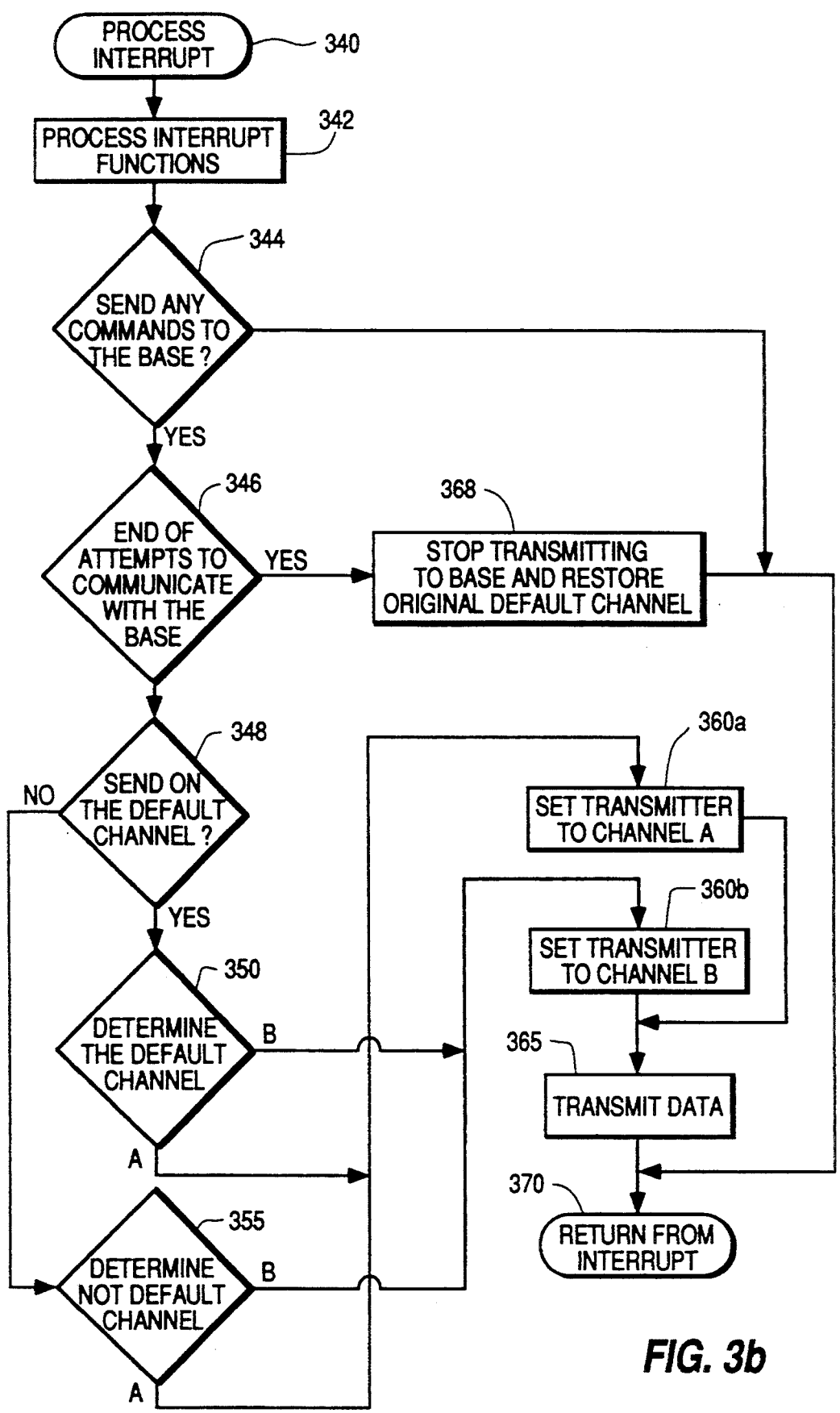

The interrupt routine for handunit controller 112 is shown in FIG. 3B. Initialization of registers for execution of the interrupt program is begun at step 340. The interrupt routine is entered at step 342. At step 344 a check is made to see if any commands need to be sent to base unit 320. If not, the routine is exited at step 370. If so, a check is made to see if all attempts at communication with the base unit have failed (step 346). If yes, then the transmissions are stopped and the original default channel is restored (step 368), and the routine exited at step 370. At step 348, a check is made to see if transmission should be made on the default channel. If yes, the routine advances to step 350 to determine which of A or B is the default channel. If A is the default channel then the routine advances to step 360a, if B is the default channel then the routine advances to step, 360b. If at step 348 a determination was made not to transmit on the default channel, then the routine advances to step (355) where a check is made to determine the non-default channel. If A is the non-default channel then the routine advances to step 360a, if B is the non-default channel then the routine advances to step 360b. At step 365 the data is sent to base unit 120, and the routine is exited at step 370.

The main program is reentered at step 314, and loops back to step 306. Handunit 100 now expects to receive an acknowledgement to its transmission from base unit 120 and looks for such acknowledgement (step 308). At step 310 a check is made to see what channel the base unit is using. If channel A, then this fact is stored (step 312a), if channel B, then an indication of channel B is stored (step 312b).

Figure 4:
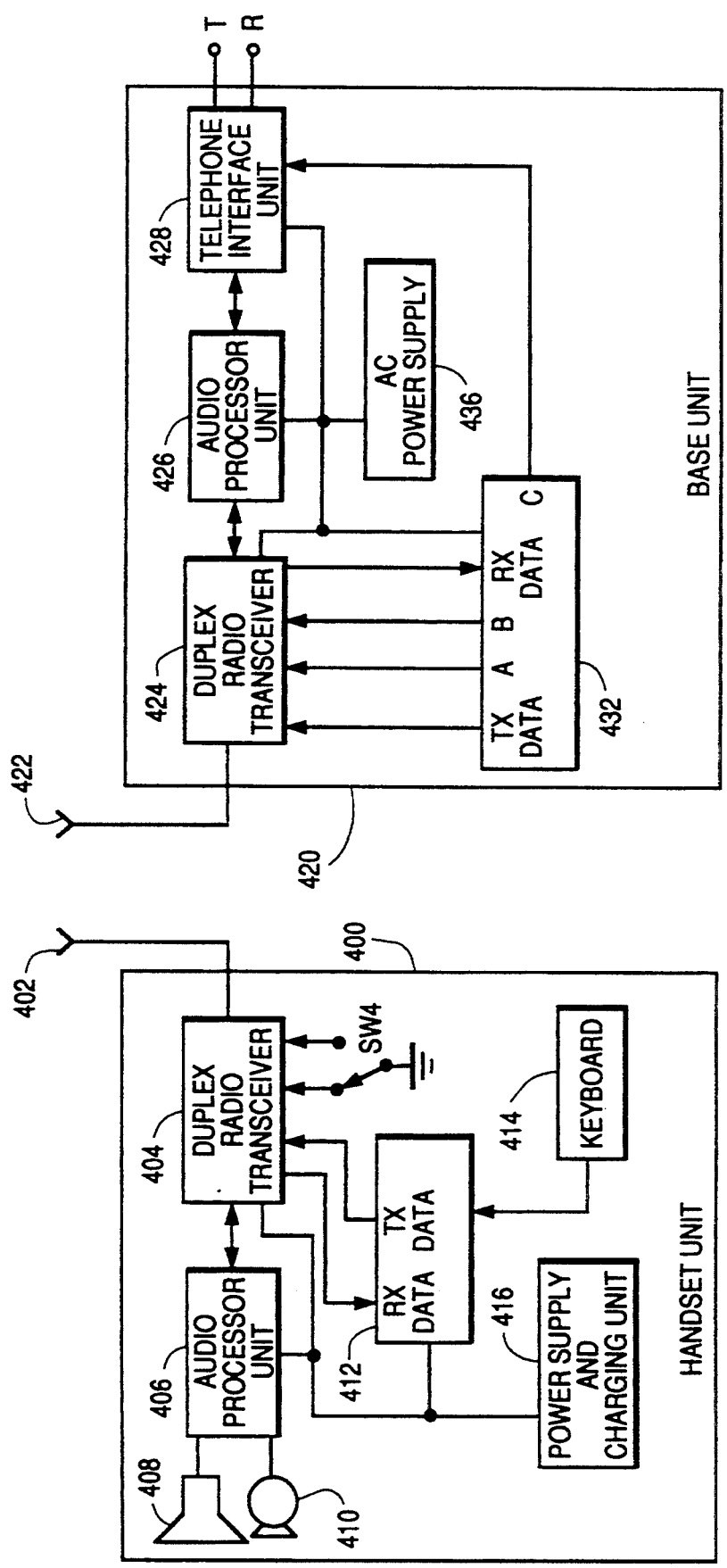
FIG. 4 shows another embodiment of the invention.

Thus, a system has been described which allows a base unit and a handunit of a cordless telephone set to operate on the same RF communications channel while requiring only one set-up switch. One skilled in the art will note that the set-up switch could equally be located in the handunit rather than in the base unit, and this modification is fully intended to be within the scope of the invention. Such an arrangement is shown in FIG. 4 which other than the placement of the selection switch is identical to FIG. 1, and need not be described in detail again.

What is claimed is:

1. A cordless telephone set, comprising:
 a handunit including a controller;
 a base unit having a base unit controller and having an output for coupling to a telephone system;
 said base unit includes a user-operable switch for selecting one of a plurality of RF communications channels as a default channel for transmitting to said handunit;
 said handunit not including a switch for selecting one of said RF communications channels as a default channel;
 said controller of said handunit causing transmission to said base unit on a first one of said plurality of said RF communications channels;
 said controller of said handunit, in the absence of receipt of an acknowledgment signal from said base unit, automatically switches to another of said plurality of said RF communications channels; and
 said controller of said handunit, upon receipt of said acknowledgment signal from said base unit, determines that the currently selected one of said plurality of RF communications channels is said selected default channel of said base unit, and stores current channel information as default channel information for said handunit.

2. A cordless telephone set, comprising:
 a handunit;
 a base unit having an output for coupling to a telephone system, said base unit including a controller;
 said handunit includes a user-operable switch for selecting said one of a plurality of RF communications channels as a default channel for transmitting to said base unit;
 said base unit not including a switch for selecting one of said RF communications channels as a default channel;
 said controller of said base unit causing transmission to said handunit on a first one of said plurality of said RF communications channels;
 said controller of said base unit, in the absence of receipt of an acknowledgment signal from said handunit, automatically switches to another of said plurality of said RF communications channels;

said controller of said base unit, upon receipt of said acknowledgment signal from said handunit, determines that the currently selected one of said plurality of RF communications channels is said selected default channel of said handunit, and stores current channel information as default channel information for said base unit.

* * * * *